(12) United States Patent
Young

(10) Patent No.: US 8,255,634 B2
(45) Date of Patent: Aug. 28, 2012

(54) APPARATUS AND METHODS FOR LOOK-AHEAD VIRTUAL VOLUME META-DATA PROCESSING IN A STORAGE CONTROLLER

(75) Inventor: Howard Young, Thousand Oaks, CA (US)

(73) Assignee: LSI Corporation, Milpitas, CA (US)

( * ) Notice: Subject to any disclaimer, the term of this patent is extended or adjusted under 35 U.S.C. 154(b) by 106 days.

(21) Appl. No.: 12/854,800

(22) Filed: Aug. 11, 2010

(65) Prior Publication Data

US 2012/0042115 A1    Feb. 16, 2012

(51) Int. Cl.
*G06F 12/00* (2006.01)
*G06F 13/00* (2006.01)
*G06F 13/28* (2006.01)

(52) U.S. Cl. ............... 711/137; 711/154; 711/E12.004
(58) Field of Classification Search .................. None
See application file for complete search history.

(56) References Cited

U.S. PATENT DOCUMENTS

| | | | |
|---|---|---|---|
| 5,148,538 A * | 9/1992 | Celtruda et al. ............ 711/205 |
| 5,586,289 A | 12/1996 | Chin et al. | |
| 6,763,375 B1 | 7/2004 | Basso et al. | |
| 7,191,304 B1 * | 3/2007 | Cameron et al. ............ 711/202 |
| 7,330,961 B2 * | 2/2008 | Sakata et al. ............... 711/210 |
| 7,610,464 B2 * | 10/2009 | Otsuka ......................... 711/163 |
| 2003/0225993 A1 * | 12/2003 | Yagisawa et al. .......... 711/202 |
| 2005/0172067 A1 * | 8/2005 | Sinclair ....................... 711/103 |
| 2007/0113044 A1 * | 5/2007 | Day et al. .................... 711/207 |
| 2007/0208885 A1 * | 9/2007 | Otsuka ......................... 710/22 |
| 2007/0214325 A1 * | 9/2007 | Sasamoto .................... 711/137 |
| 2008/0282047 A1 * | 11/2008 | Arakawa et al. ............ 711/162 |
| 2010/0211752 A1 * | 8/2010 | Otsuka ......................... 711/163 |
| 2010/0228650 A1 | 9/2010 | Shacham et al. | |
| 2011/0138390 A1 | 6/2011 | Takeuchi | |
| 2011/0258404 A1 * | 10/2011 | Arakawa et al. ............ 711/162 |

* cited by examiner

*Primary Examiner* — Edward Dudek, Jr.
*Assistant Examiner* — Matthew Chrzanowski
(74) *Attorney, Agent, or Firm* — Duft Bornsen & Fishman LLP

(57) ABSTRACT

Apparatus and methods for improved efficiency in accessing meta-data in a storage controller of a virtualized storage system. Features and aspects hereof walk/retrieve meta-data for one or more other I/O requests when retrieving meta-data for a first I/O request. The meta-data may include mapping information for mapping logical addresses of the virtual volume. Meta-data may also include meta-data associated with higher level, enhanced data services provide by or in conjunction with the storage system. Enhanced data services may include features for synchronous mirroring of a volume and/or management of time-based snapshots of the content of a virtual volume.

21 Claims, 5 Drawing Sheets

US 8,255,634 B2

APPARATUS AND METHODS FOR LOOK-AHEAD VIRTUAL VOLUME META-DATA PROCESSING IN A STORAGE CONTROLLER

BACKGROUND

1. Field of the Invention

The invention relates generally to storage controllers of storage systems and more specifically relates to apparatus and methods for improved efficiency in processing of virtual to physical mapping meta-data in a storage controller.

2. Related Patents

This patent is related to commonly owned U.S. patent application Ser. No. 12/854,765 entitled APPARATUS AND METHODS FOR MANAGING EXPANDED CAPACITY OF VIRTUAL VOLUMES IN A STORAGE SYSTEM and is related to commonly owned U.S. patent application Ser. No. 12/854,720 entitled APPARATUS AND METHODS FOR REAL-TIME ROUTING OF RECEIVED COMMANDS IN A SPLIT-PATH ARCHITECTURE STORAGE, both of which are hereby incorporated by reference.

3. Discussion of Related Art

Virtualized storage systems define one or more virtual volumes for use by attached host systems. Each virtual volume comprises a range of contiguous logical addresses (e.g., logical block addresses or LBAs) that are mapped to some physical storage locations on storage devices associated with the storage system. A storage controller of the storage system is coupled with the attached host systems and with physical storage devices associated with the storage system. The storage controller receives I/O requests from attached host systems and/or from storage related services provided within the storage system. The storage controller then translates or maps the logical addresses affected by the I/O request into corresponding physical storage locations.

The mapping meta-data structure for a simple logical/virtual volume is typically a relatively simple table structure that maps logical addresses to corresponding physical storage locations. Such a relatively simple meta-data structure may typically be stored in a cache memory or other high speed memory for rapid access to thus reduce overhead processing of the storage controller. Use of such mapping meta-data structures is often referred to as "walking" the mapping meta-data structure. A "walk" of the mapping structure for a simple read or write access to a simple virtual volume is relatively rapid and uses relatively little CPU and memory bandwidth of the storage controller—thus, imposing a relatively small overhead processing burden on the storage controller as it may impact overall storage system performance.

In some storage systems, the storage controller of the storage system (or other Components—e.g., network appliances associated with the storage system) may provide various enhanced data services within the storage system. These enhanced data services provide a number of data services beyond simple read and write access to data stored on a simply logical/virtual volume. For example, some virtualized storage systems provide data services within the storage system for automated synchronous mirroring (e.g., mirroring of data to another volume such as for reliability or for remote replication of data). Still other exemplary enhanced data services may provide for automated snapshot generation (i.e., to create shadow or snapshot copies of the contents of a virtual volume such as for replication or backup data services).

These and other exemplary enhanced data services may involve far more complexity in their respective access to mapping meta-data and other meta-data pertaining to accessing the virtual volume for the enhanced services. For example, access to a synchronous mirrored volume of a virtual volume may, at a minimum, involve accessing mapping meta-data for two virtual/logical volumes. Or, for example, access to automatically generated snapshots may entail accessing significantly more meta-data to identify a particular point in time snapshot of the contents of a logical/virtual volume.

This added complexity in providing virtual to physical mapping where a volume is utilizing enhanced data services can add significant overhead to the processing of the storage controller in "walking" the mapping and other meta-data structures associated with the virtual volumes. This added overhead processing can rise to a level that notably, negatively impacts overall performance of the storage system.

Thus, it is an ongoing challenge to reduce the overheard processing involved in managing meta-data for virtual volumes managed by a storage controller of a virtualized storage system.

SUMMARY

The present invention solves the above and other problems, thereby advancing the state of the useful arts, by providing apparatus and methods and systems for improved efficiency in accessing meta-data in a storage controller of a virtualized storage system. Features and aspects hereof walk/retrieve meta-data for one or more other I/O requests when retrieving meta-data for a first I/O request. The meta-data may include mapping information for mapping logical addresses of the virtual volume. Meta-data may also include meta-data associated with higher level, enhanced data services provide by or in conjunction with the storage system. Enhanced data services may include features for synchronous mirroring of a volume and/or management of time-based snapshots of the content of a virtual volume.

In one aspect hereof, a storage controller within a virtualized storage system is provided. The virtualized storage system comprises a virtual volume, the virtual volume comprising a portion of one or more physical storage devices coupled with the storage controller. The controller is adapted for processing I/O requests directed to the virtual volume. The controller comprises a memory for storing meta-data regarding the virtual volume and an I/O processor, coupled with the memory, operable to receive a first I/O request associated with first meta-data and operable to receive a second I/O request associated with second meta-data. The I/O processor is adapted to process the first I/O request. The processing of the first I/O request comprises retrieving the first and second meta-data. The I/O processor is further adapted to process the second I/O request using the previously retrieved second meta-data.

Another aspect hereof provides a method operable in a storage controller in a storage system for accessing meta-data associated with a virtual volume of the storage system and provides a computer readable medium storing programmed instructions to implement the method. The virtual volume comprises portions of one or more physical storage devices associated with the storage system. The method comprises receiving in the storage controller a first I/O request directed to the virtual volume. The first I/O request is associated with first meta-data stored in a memory of the storage controller. The method also comprises receiving a second I/O request directed to the virtual volume. The second I/O request associated with second meta-data stored in the memory. The method also comprises processing the first I/O request in the storage controller to access the virtual volume based on the first meta-data. The step of processing the first I/O request comprises retrieving the first and second meta-data from the memory. The method also comprises processing the second I/O request in the storage controller to access the virtual volume based on the previously retrieved second meta-data.

DETAILED DESCRIPTION OF THE DRAWINGS

Figure 1:
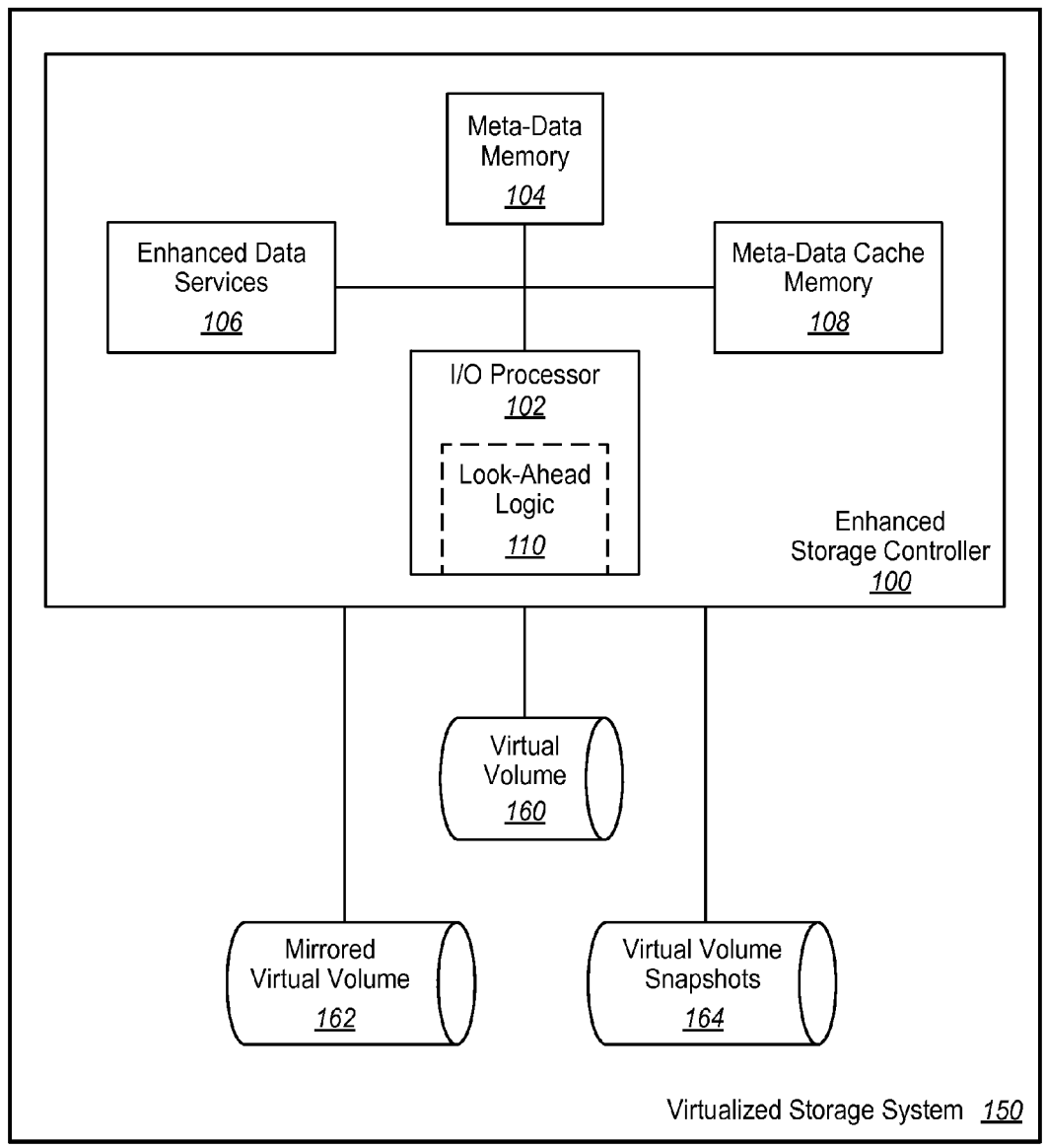
FIG. 1 is a block diagram of an exemplary virtualized storage system including a storage controller enhanced in accordance with features hereof to more efficiently process meta-data associated with access to virtual volumes of the system.

FIG. 1 is a block diagram of a virtualized storage system 150 comprising a storage controller 100 enhanced in accordance with features and aspects hereof for improved efficiency in accessing and utilizing meta-data associated with access to one or more virtual volumes. Enhanced storage controller 100 may be coupled with any number of virtual volumes 160. Virtual volume 160 may comprise portions of one or more physical storage devices such as rotating optical or magnetic disk drives as well as semiconductor storage devices (e.g., RAMdisks or flash memory disks).

Enhanced storage controller 100 includes one or more I/O processors 102. Each of one or more of the I/O processors 102 may comprise a general or special purpose programmable processor (CPU) and associated program memory from which programmed instructions are fetched and executed. Additionally or in the alternative, each of one or more of the I/O processors 102 may comprise customized circuitry adapted for rapidly executing common I/O requests such as read and write I/O requests directed to a virtual volume 160. In some exemplary embodiments, enhanced storage controller 100 may include both a CPU based I/O processor 102 (sometimes referred to as a "software" or "soft-path" I/O processor) as well as a custom circuitry I/O processor 102 (sometimes referred to as a "hard-path" or "fast-path" I/O processor).

Regardless of the type of I/O processor and the number of such I/O processors in the storage controller, access to any virtual volume 160 entails access to meta-data stored in meta-data memory 104. At a minimum, meta-data in memory 104 comprises mapping information used to map logical addresses of a virtual volume 160 into corresponding physical storage locations on one or more physical storage devices. Processing of such mapping information in the meta-data of memory 104 may consume significant processing capability of I/O processor 102. In accordance with features and aspects hereof, enhanced storage controller 100 may include look-ahead logic 110 adapted to look ahead when processing a first I/O request to determine if a subsequent I/O request may utilize meta-data stored in relatively close proximity to the meta-data associated with the first I/O request. Such logic 110 may be integral within one or more of the I/O processors 102 or, as a matter of design choice, may be implemented as circuits external to any of the I/O processors 102. Further, where an I/O processor 102 is implemented with a CPU and programmed instructions, logic 110 may be similarly implemented as programmed instructions. Where an I/O processor 102 is implemented as customized I/O processing circuits, logic 110 may be integrated as custom logic circuits within the processor 102. Thus, I/O processor 102 is operable to access meta-data associated with a first I/O request and with one or more other I/O requests as an aspect of processing the first I/O request. When processing the subsequent I/O requests, the requisite meta-data for such other requests may be accessed without again referencing complex data structures in meta-data memory 104. Rather, the previously retrieved meta-data for the other I/O requests may be more conveniently stored for rapid access by I/O processor 102. In one exemplary embodiment, the previously retrieved meta-data for other I/O requests may be temporarily saved in a meta-data cache memory 108. Meta-data cache memory 108 may be any suitable memory component for saving meta-data previously retrieved.

The overhead processing associated with accessing meta-data in memory 104 is further exacerbated when the enhanced storage controller 100 of storage system 150 includes enhanced data services 106. Enhanced data services 106 comprise higher-level data management functions provided by storage controller 100 (or, as a matter of design choice, provided by another computational device within the storage system 150 or otherwise associated with storage system 150). Enhanced data services 106 may include, for example, synchronous mirroring of a virtual volume 160. Such synchronous mirroring of virtual volume 160 may automatically duplicate or replicate all data of virtual volume 160 onto one or more mirrored virtual volumes 162. Simple localized mirroring may entail well known RAID level 1 storage management provided by storage controller 100. However, synchronous mirroring data services 106 may also include mirroring or duplication of data of virtual volume 160 to a physically remote or even geographically remote mirrored virtual volume 162 (unlike localized mirroring as performed by RAID level 1 management using locally attached storage devices). Enhanced data services 106 may also include snapshot management for providing a plurality of time-based snapshots of the contents of virtual volume 160. In such snapshot-related enhanced data services, upon request by a user or based on an automated schedule, a point in time snapshot of the contents of virtual volume 160 may be created and stored as virtual volume snapshot 164. Any number of such snapshots may be managed by enhanced data services 106 depending on the needs of a particular application and the snapshots 164. Meta-data in memory 104 associates each snapshot 164 with the virtual volume 160 from which it is derived.

I/O requests to be processed that reference a virtual volume including such enhanced data services may entail substantially more processing of meta-data in memory 104. For example, simply identifying a volume to be accessed in an I/O request may entail determining from meta-data in memory 104 which of a plurality of mirrored virtual volumes 162 and/or which of a plurality of virtual volume snapshots 164 is identified by the I/O request. The meta-data access to make such a volume identification determination may be substantial in addition to the further meta-data access required to map logical addresses to physical addresses for the specific volume snapshot or mirror identified. Thus, I/O processor 102 of enhanced storage controller 100 provides enhancements as look-ahead logic 110 to access meta-data in memory 104 when processing any number of subsequent I/O requests while processing a first received I/O request. Look-ahead logic 110 may be implemented as suitably designed custom logic circuits (optionally integrated with a hard-path I/O processor 102) or as programmed instructions to be executed by a CPU of a soft-path I/O processor 102.

Those of ordinary skill in the art will recognize a wide variety of additional higher-level data services that may be provided in association with a virtualized storage system. Many such additional data services may entail similar added complexity in processing of meta-data to identify a particular volume and/or to map logical addresses to corresponding physical storage location. Still further, those of ordinary skill in the art will readily recognize numerous additional and/or equivalent elements in a fully functional storage controller 100 of a storage system 150. Such additional and/or equivalent elements are omitted herein for simplicity and brevity of this discussion.

Figure 2:
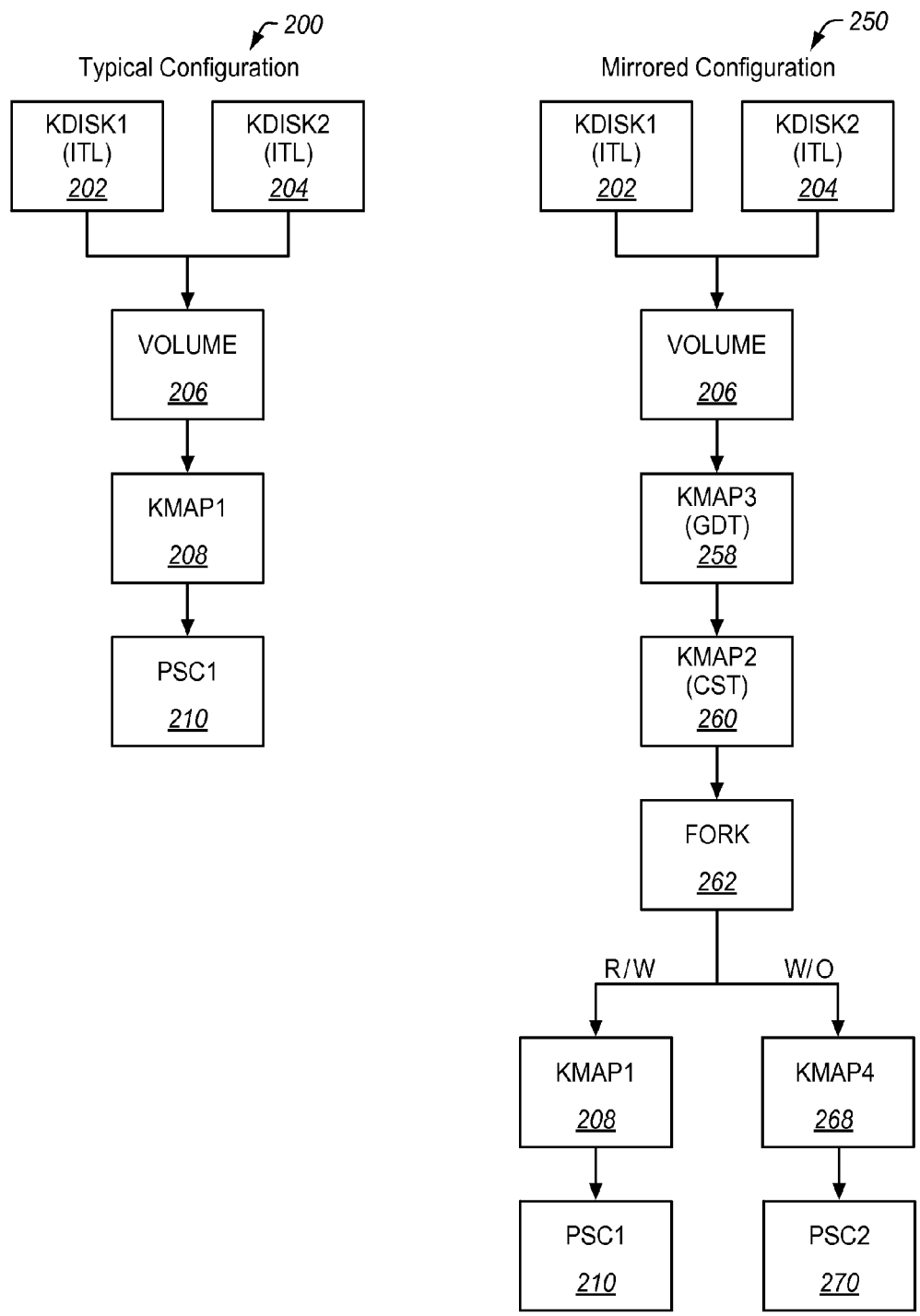
FIG. 2 is a block diagram of exemplary hierarchical meta-data structures walked by systems and methods in accordance with features and aspects hereof.

FIG. 2 is a block diagram of exemplary hierarchical meta-data structures that may be efficiently walked by methods and systems in accordance with features and aspects hereof. FIG. 2 exhibits one exemplary implementation of the meta-data structures that typifies the hierarchical complexity required to identify physical storage locations corresponding to logical addresses used to access a virtual volume. FIG. 2 also exhibits the added complexity when data services implemented within the storage system (such as mirroring).

A typical configuration 200 is shown representing hierarchical meta-data for a simple virtual volume. Multiple initiators may access the same virtual volume each using a different virtual volume identifier (e.g., a virtual target identifier) corresponding to its nexus (a particular initiator ID connecting to a particular virtual volume target ID or an "I_T nexus"). A "KDISK" meta-data structure is first used to map the I_T nexus to a particular virtual volume based on the initiator and target identifiers. Therefore, either KDISK1 202 structure or KDISK2 204 structure is first selected based on the I_T nexus of a received I/O request to locate the volume meta-data structure 206. The volume meta-data structure 206 represents the addressed virtual volume and points to the base of a plurality of KMAP structures—one for each of potentially multiple segments of the virtual volume. For example, in one exemplary embodiment, a different KMAP structure may exist for each 2 terabyte segment of the virtual volume's total storage capacity. Thus, volume structure 206 and the logical addresses accessed by the I/O request will identify the specific KMAP1 meta-data structure 208 to be used for the segment to be accessed. Each KMAP data structure may point to yet another hierarchical layer of physical data meta-data structures. Each physical data meta-data structure may be used to map still smaller granularity of pages of the segment from virtual/logical addresses to corresponding physical addresses. Thus, the KMAP 1 structure 208 and the logical address of the I/O request locate a particular PSC1 meta-data structure 210 to locate the mapping data for a specific page of logical addresses of the I/O request.

For this typical configuration 200 it can be seen that a number of hierarchical layers of meta-data may be traversed or walked to determine the physical addresses corresponding to a range of logical addresses of an I/O request. Thus, when "walking" the meta-data for a range of logical addresses corresponding to a first I/O request, methods and structures hereof extend the range of logical addresses to be translated to include one or more other I/O requests also queued for processing by the storage system. The meta-data so obtained from the extended range of logical addresses may then be saved (e.g., "cached") for later use when the subsequent I/O requests are unqueued and processed.

As data services implemented within the storage system are applied to the volume (as in the synchronous mirror configuration), still further complexity of hierarchical structures may be encountered. For example, the mirror configuration 250 comprises KMAP3 258, KMAP2 260, and FORK 262 structures layered in front of the original KMAP1 208 and PSC1 210 structures. Underneath the FORK structure 262, the hierarchy is extended with KMAP4 266 and PSC2 170 once the user adds a mirrored volume (e.g., RAID level 1) capability to the typical configuration. The user could create third and fourth copies (under the FORK 262) for additional redundancy.

Services such as "snapshot" or thinly provisioned volumes may be implemented in "page tables" referenced by a KMAP structure. For example, each page of a segment may present 1 megabyte of storage and a page table pointing to a plurality of such physical pages may present 1 gigabyte of storage. When the user requests a volume snapshot, the segment state for all segments may be set to "Read Only" to thereby cause a map fault on subsequent write I/O. Prior to issuing the write command to the target, a copy of the segment may be copied to a different target (thus creating another tree of mapped structures using a FORK meta-data structure. Once completed, the pending write command is issued and updates the newly generated mapping structures for the snapshot. Thin provision volume services may handled by setting segment states to "Zero on Read" causing the system to return data full of zeros responsive to a read request. However, when a write command is issued to the target, the write command is queued then segments are automatically provisioned from a pool of free storage and the mapping structures are updated accordingly. After provisioning the data storage to be written, the pending command is issued to the newly provisioned storage.

Storage services such as snapshots or thin provisioning applied to a mirror configuration also requires a KMAP and associated page tables. Since there are more (e.g., two or more) KMAP structures underneath the FORK structure, a KMAP structure may also be layered in front the FORK structure to provide a Common State Table (CST) for the services (e.g., KMAP2 260). Still further, snapshot services, thin provisioning services, etc. are applied to segments in the KMAP2 260 CST. The top level of the mirror configuration is a Global Dirty Table (GDT) in KMAP3 structure 258. The GDT may be used for system crash recovery and during mirror creation. When the meta-data structures are created, the GDT state is set to fault read or write I/O requests prior to issuing the command. This state causes the parallel mirror segments to resynchronize and become clean again allowing pending commands to that segment to continue processing on successive maps.

Those of ordinary skill in the art will recognize that the exemplary structures of FIG. 2 are intended to exhibit one possible design choice that reflects the complexity of hierarchical meta-data structures used to access virtual volumes. A wide variety of other possible meta-data structures will be readily apparent to those of ordinary skill in the art having more or less hierarchical complexity and reflecting the requirements of other forms of data services.

Figure 3:
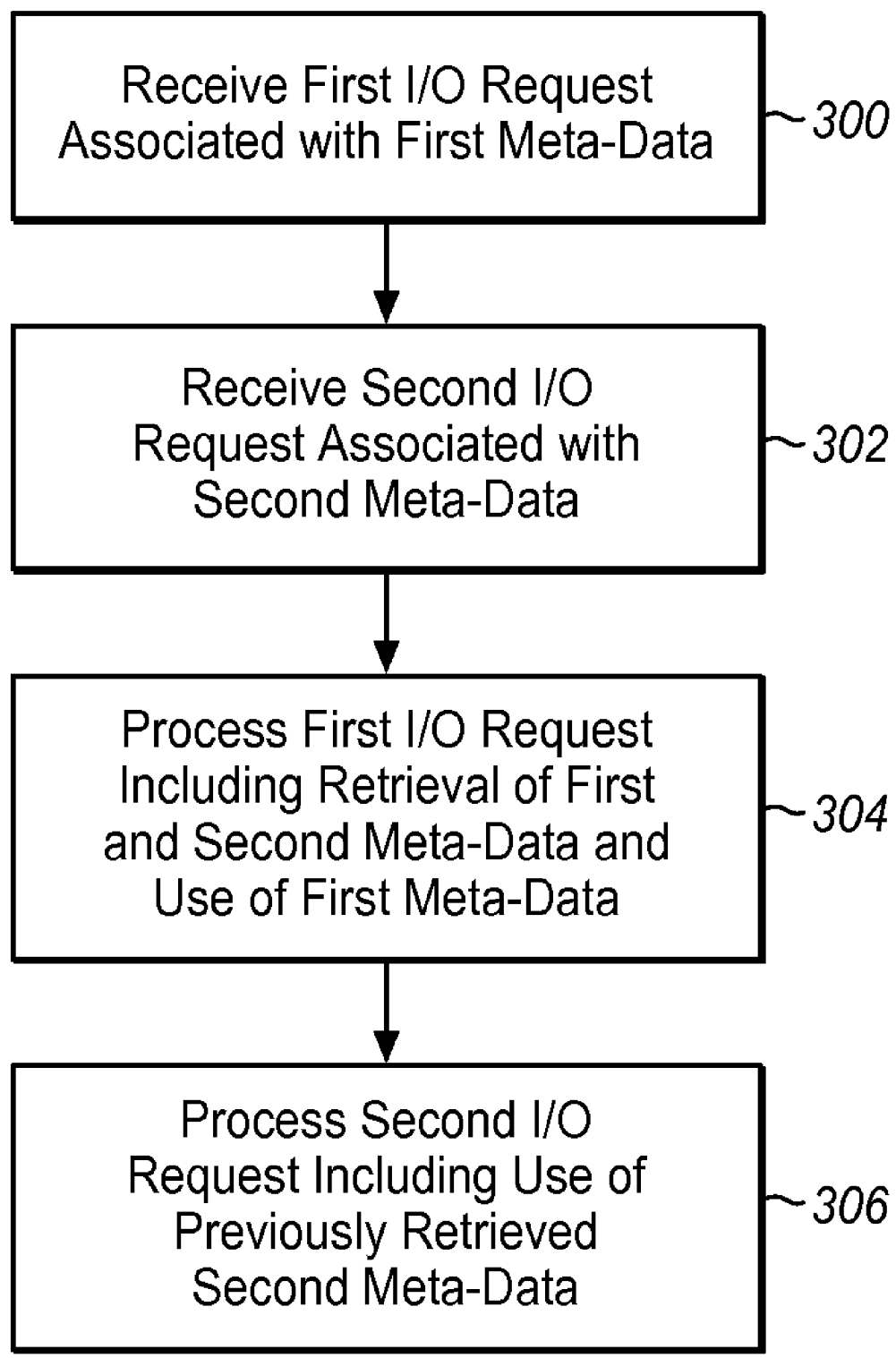
FIG. 3 is a flowchart describing an exemplary method in accordance with features and aspects hereof to efficiently process meta-data associated with accessing a virtual volume of a storage system by looking ahead to subsequent I/O requests when accessing meta-data for a first I/O request.

FIG. 3 is a flowchart describing an exemplary method in accordance with features and aspects hereof to more efficiently manage access to meta-data associated with I/O requests directed to a virtual volume of a storage system. The method of FIG. 3 may be operable in, for example, enhanced storage controller 100 of FIG. 1 or any other suitable computational/electronic device used by a virtualized storage system to process I/O requests received by the storage system. More specifically, the method of FIG. 3 may be operable in one or more I/O processors of a storage controller such as I/O processors 102 of FIG. 1. Step 300 receives a first I/O request from an attached host or from data services provided in association with the storage system. The first I/O request is associated with first meta-data. As noted above, the first meta-data may include, at a minimum, mapping information used for mapping logical addresses of the identified virtual volume to corresponding physical storage locations of one or more physical storage devices. In addition, the first meta-data may include data services information associated with higher-level data services provided by the storage controller of the storage system or provided by other computational components associated with the storage system or external to the storage system. At step 302, a second I/O request is received. The second I/O request is associated with second meta-data. Second meta-data, as above with respect to first meta-data, may include mapping information meta-data for mapping logical to physical addresses as well as data services information used to identify features of higher-level data services functionality. As noted above, higher-level data services may include, for example, synchronous mirroring of the contents of a virtual volume to provide one or more mirrored copies of the virtual volume data contents either locally or remotely. In addition, data services may include features to generate and manage one or more time-based snapshots of the contents of a virtual volume. Such time-based snapshot may be used, for example, in providing backup services for data stored on the virtual volume and for other purposes.

Having received a first and second I/O request, an I/O processor of a storage controller will eventually commence processing of the first I/O request. As an aspect of processing the first I/O request, the I/O processor will retrieve both the first and second meta-data associated with the first and second I/O requests, respectively. The retrieved first meta-data will be used directly in step 304 for processing of the first I/O request. For example, the first meta-data may be retrieved to aid in processing the first I/O request by mapping logical addresses of an identified volume to corresponding physical storage location. However, in accordance with enhanced features and aspects hereof, in retrieving the first meta-data, the I/O processor will detect that the second meta-data is physically nearby the memory location containing the first meta-data. Access to the first meta-data may also retrieve the second meta-data corresponding to the second I/O request. More generally, in accessing the first meta-data, any nearby meta-data associated with one or more other I/O requests received subsequent to receipt of the first I/O request may be retrieved. Thus, the method "looks ahead" to reduce overhead processing of the I/O processor of the enhanced storage controller in retrieving and manipulating meta-data stored in a meta-data memory of the storage controller. When the I/O controller processor commences processing of the second I/O request at step 306, the previously retrieved second meta-data is utilized for processing of the second I/O request. Thus, processing of the second I/O request does not require a new access to meta-data memory to retrieve the second meta-data. Rather, the second meta-data was more efficiently retrieved substantially during the same access that retrieved the first meta-data at processing of step 304. The enhanced method may therefore avoid "walking" complex hierarchical meta-data structures (such as exemplified in FIG. 2) for the second and other subsequent I/O requests by accessing meta-data for other requests during the "walking" of the meta-data for the first I/O request.

Figure 4:
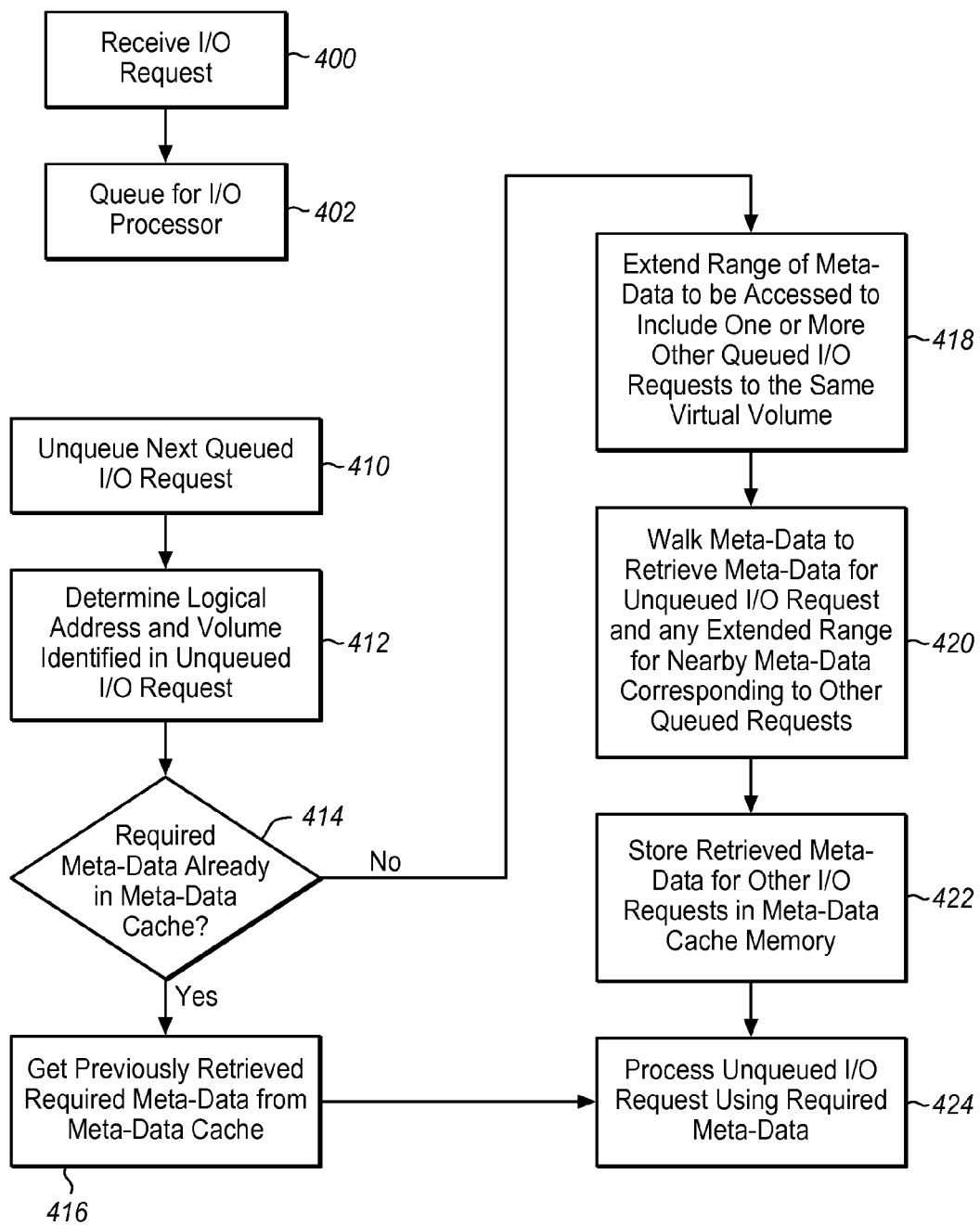
FIG. 4 is a flow chart describing another exemplary method in accordance with features and aspects hereof to efficiently process meta-data associated with accessing a virtual volume of a storage system by looking ahead to subsequent I/O requests when accessing meta-data for a first I/O request.

FIG. 4 is a flowchart describing another exemplary method enhanced in accordance with features and aspects hereof to more efficiently manage meta-data associated with processing of I/O requests in a storage controller of a virtualized storage system. The method of FIG. 4 may be operable, for example, in an enhanced storage controller such as storage controller 100 of FIG. 1. More specifically, the method of FIG. 4 may be operable, for example, in I/O processor 102 of enhanced storage controller 100 of FIG. 1. At step 400, a new I/O request is received and at step 402, the newly received I/O request may be added to a queue of pending requests to be processed by the I/O processor. Steps 400 and 402 are then repeated for each newly received I/O request. Asynchronously with respect to receipt of the I/O request, steps 410 through 424 represent aspects of processing an I/O request previously received and queued by operation of steps 400 and 402.

Step 410 unqueues a next queued I/O request to be processed by the I/O processor. At step 412, the I/O processor determines the range of logical addresses and virtual volume(s) identified for access in the newly unqueued I/O request. Step 414 then determines whether the meta-data required to process the newly unqueued I/O request (e.g., a first I/O request) is already available. As discussed herein, the required meta-data may have been previously retrieved in the processing of a prior I/O request. If the required meta-data is already available (previously retrieved), step 416 gets the previously retrieved meta-data from a meta-data cache memory. Step 424 then completes processing of the newly unqueued I/O request using the previously retrieved meta-data.

If the required meta-data has not been previously retrieved, step 418 computationally extends the range of meta-data to be accessed in processing of the newly unqueued I/O request. The extended range of meta-data to be accessed may include meta-data associated with one or more other queued I/O requests directed to the same virtual volume (e.g., directed to the same mirrored copy and/or time-based snapshot volume, etc.). In one exemplary embodiment, the extended range of meta-data to be accessed may be determined by a fixed additional offset from the starting logical block address of the newly unqueued I/O request. For example, the meta-data to be retrieved from the meta-data memory may start with the meta-data for the range of logical block addresses for the virtual volume identified in the unqueued I/O request. The range of meta-data to be retrieved may then be computationally extended from that starting point through a pre-determined fixed number of additional meta-data entries or through a predetermined fixed range of meta-data memory addresses.

In other exemplary embodiments, step 418 may inspect the queue of other I/O requests awaiting processing. The range of meta-data may then be computationally extended to assure retrieval of meta-data for one or more other I/O requests presently in the queue of pending I/O requests.

At step 420, the extended range of meta-data is retrieved by "walking" the meta-data structures. The walk of the structures for the extended range retrieves meta-data associated with the newly unqueued I/O request and retrieves meta-data associated with any other pending I/O requests whose meta-data lies in the extended range of meta-data. The meta-data is "walked" in the sense that any data structures associated with the logical to physical mapping may be accessed as well as data structures relating to any higher-level data services associated with the I/O request. Such data structures may include complex indirect pointers, object handles, hierarchical structures, etc. Thus, where the data structures for the meta-data include, for example, hierarchical layers of data structures or other indirection complexity, the complexity of accessing (walking) the meta-data structures for the presently unqueued (e.g., first) I/O request need not be duplicated for accessing meta-data associated with other queued I/O requests utilizing meta-data stored nearby the first meta-data.

Step 420 stores in a meta-data cache memory any retrieved meta-data within the extended range of retrieved meta-data that corresponds with other I/O requests. The meta-data for such other I/O requests is thereby accessible for use in processing the other requests without repeating the overhead processing associated with walking the meta-data structures in the meta-data memory (as discussed above with reference to steps 414 and 416). That overhead processing may be performed when processing the first I/O request and need not be repeated for the meta-data in the extended range for other I/O requests. Lastly, step 424, as above, processes the unqueued I/O request using the retrieved meta-data for that request.

Figure 5:
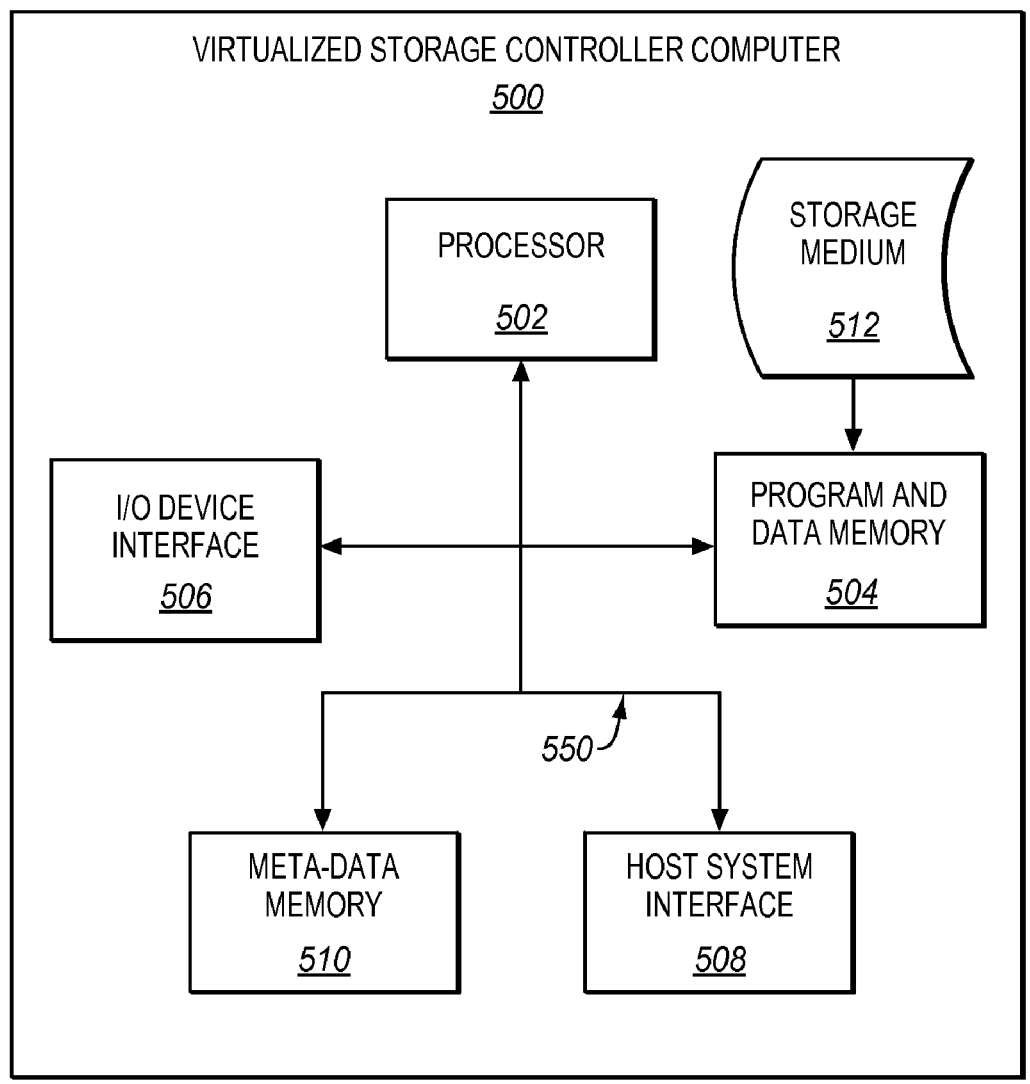
FIG. 5 is a block diagram of an exemplary computing device adapted to receive a computer readable medium embodying methods for efficient access to meta-data associated with virtual volume access in accordance with features and aspects hereof.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc. FIG. 5 is a block diagram depicting a storage controller computer 500 adapted to provide features and aspects hereof by executing programmed instructions and accessing data stored on a computer readable storage medium 512.

Furthermore, embodiments of the invention can take the form of a computer program product accessible from a computer-usable or computer-readable medium 512 providing program code for use by, or in connection with, a computer or any instruction execution system. For the purposes of this description, a computer-usable or computer readable medium can be any apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A storage controller computer 500 suitable for storing and/ or executing program code will include at least one processor 502 coupled directly or indirectly to memory elements 504 through a system bus 550. The memory elements 504 can include local memory employed during actual execution of the program code, bulk storage, and cache memories that provide temporary storage of at least some program code in order to reduce the number of times code must be retrieved from bulk storage during execution. Meta-data memory 510 may be accessed by processor 502 via bus 550 to retrieve meta-data for processing of I/O requests.

Input/output interface 506 couples the controller to I/O devices to be controlled (e.g., storage devices, etc.). Host system interface 508 may also couple the computer 500 to other data processing systems.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage controller within a virtualized storage system, the virtualized storage system comprising a virtual volume, the virtual volume comprising a portion of one or more physical storage devices coupled with the storage controller, the controller adapted for processing I/O requests directed to the virtual volume, the controller comprising:
a memory for storing meta-data regarding the virtual volume; and
an I/O processor, coupled with the memory, operable to receive a first I/O request associated with first meta-data and operable to receive a second I/O request associated with second meta-data,
wherein the I/O processor is adapted to identify the first and second meta-data, and to process the first I/O request, the processing of the first I/O request comprising retrieving the identified first meta-data and identified second meta-data, the I/O processor further adapted to process the second I/O request using the previously retrieved second meta-data.

2. The controller of claim 1
wherein the first and second meta-data in the memory each comprise mapping information for mapping logical addresses associated with the virtual volume into corresponding physical storage locations of the one or more physical storage devices.

3. The controller of claim 1
wherein the virtual volume comprises a plurality of snapshots of data stored in the virtual volume, and
wherein the meta-data in the memory comprises mapping information for each of the plurality of snapshots, wherein the meta-data for each snapshot comprises mapping logical addresses associated with the snapshot into corresponding physical storage locations of the one or more physical storage devices.

4. The controller of claim 1
wherein the virtual volume comprises one or more mirror images of data stored in the virtual volume, and
wherein the meta-data in the memory comprises mapping information for each of the one or more mirror images, wherein the meta-data for each mirror image comprises mapping logical addresses associated with the mirror image into corresponding physical storage locations of the one or more physical storage devices.

5. The controller of claim 1
wherein the I/O processor is further adapted to retrieve a portion of meta-data from the memory that comprises the first and second meta-data and other meta-data associated with another I/O requests not yet received, and wherein the I/O processor is further adapted to process said another I/O requests using the previously retrieved said other meta-data.

6. The controller of claim 5 wherein the portion of meta-data has a predefined size.

7. The controller of claim 1 further comprising:
a meta-data cache memory for storing the retrieved first and second meta-data,
wherein the I/O processor is further adapted to use the second meta-data stored in the meta-data cache memory in processing the second I/O request.

8. A method operable in a storage controller in a storage system for accessing meta-data associated with a virtual volume of the storage system, the virtual volume comprising portions of one or more physical storage devices associated with the storage system, the method comprising:
receiving in the storage controller a first I/O request directed to the virtual volume, the first I/O request associated with first meta-data stored in a memory of the storage controller;
receiving in the storage controller a second I/O request directed to the virtual volume, the second I/O request associated with second meta-data stored in the memory;
identifying the first and second meta-data;
processing the first I/O request in the storage controller to access the virtual volume based on the first meta-data, wherein the step of processing the first I/O request comprises retrieving the identified first meta-data and identified second meta-data from the memory; and
processing the second I/O request in the storage controller to access the virtual volume based on the previously retrieved second meta-data.

9. The method of claim 8 wherein the first and second meta-data in the memory each comprise mapping information for mapping logical addresses associated with the virtual volume into corresponding physical storage locations of the one or more physical storage devices.

10. The method of claim 9 wherein the storage system provides enhanced data services in addition to data storage and retrieval,
wherein retrieving the first and second meta-data each further comprises retrieving data services information relating to the enhanced data services provided by the storage system.

11. The method of claim 10 wherein the provided enhanced data services comprises managing a plurality of snapshots of the data stored in the virtual volume,
wherein retrieving the first and second meta-data further comprises retrieving snapshot information regarding one or more snapshots of the virtual volume and retrieving the mapping information relating to the retrieved snapshot information.

12. The method of claim 10 wherein the provided enhanced data services comprise services to manage one or more mirror images of the data stored in the virtual volume,
wherein retrieving the first and second meta-data further comprises retrieving mirror information regarding the one or more mirrors of the virtual volume and retrieving the mapping information relating to the retrieved mirror information.

13. The method of claim 8 wherein retrieving the first and second meta-data further comprises retrieving a portion of meta-data from the memory that comprises the first and second meta-data and other meta-data associated with another I/O requests not yet received,
the method further comprising:
processing said another I/O requests using the previously retrieved said other meta-data.

14. The method of claim 8 further comprising:
saving the second meta-data in a cache memory associated with the storage controller,
wherein the step of processing the second I/O request further comprises:
processing the second I/O request in the storage controller to access the virtual volume based on the second meta-data in the cache memory.

15. A non-transitory computer readable medium embodying programmed instructions which, when executed by a computing device in a storage controller of a storage system, perform a method for accessing meta-data associated with a virtual volume of the storage system, the virtual volume comprising portions of one or more physical storage devices associated with the storage system, the method comprising:
receiving in the storage controller a first I/O request directed to the virtual volume, the first I/O request associated with first meta-data stored in a memory of the storage controller;
receiving in the storage controller a second I/O request directed to the virtual volume, the second I/O request associated with second meta-data stored in the memory;
identifying the first and second meta-data;
processing the first I/O request in the storage controller to access the virtual volume based on the first meta-data, wherein the step of processing the first I/O request comprises retrieving the identified first meta-data and identified second meta-data from the memory; and
processing the second I/O request in the storage controller to access the virtual volume based on the previously retrieved second meta-data.

16. The medium of claim 15 wherein the first and second meta-data in the memory each comprise mapping information for mapping logical addresses associated with the virtual volume into corresponding physical storage locations of the one or more physical storage devices.

17. The medium of claim 16 wherein the storage system provides enhanced data services in addition to data storage and retrieval,
wherein retrieving the first and second meta-data each further comprises data services information relating to the enhanced data services provided by the storage system.

18. The medium of claim 17 wherein the provided enhanced data services comprise managing a plurality of snapshots of the data stored in the virtual volume,
wherein retrieving the first and second meta-data further comprises retrieving snapshot information regarding one or more snapshots of the virtual volume and retrieving the mapping information relating to the retrieved snapshot information.

19. The medium of claim 17 wherein the provided enhanced data services comprise services to manage one or more mirror images of the data stored in the virtual volume,
wherein retrieving the first and second meta-data further comprises retrieving mirror information regarding the one or more mirrors of the virtual volume and retrieving the mapping information relating to the retrieved mirror information.

20. The medium of claim 15 wherein retrieving the first and second meta-data further comprises retrieving a portion of meta-data from the memory that comprises the first and second meta-data and other meta-data associated with another I/O requests not yet received,
the method further comprising:
processing said another I/O requests using the previously retrieved said other meta-data.

21. The medium of claim 15 wherein the method further comprises:
saving the second meta-data in a cache memory associated with the storage controller,
wherein the step of processing the second I/O request further comprises:
processing the second I/O request in the storage controller to access the virtual volume based on the second meta-data in the cache memory.

* * * * *